United States Patent
Hoffmann et al.

(10) Patent No.: US 10,505,481 B2
(45) Date of Patent: Dec. 10, 2019

(54) METHOD AND DEVICE FOR OPERATING AN ELECTRONICALLY COMMUTATED SERVO MOTOR AND POSITION CONTROL UNIT HAVING A SERVO MOTOR

(71) Applicant: Robert Bosch GmbH, Stuttgart (DE)

(72) Inventors: Ekkehard Hoffmann, Hamburg (DE); Udo Sieber, Bietigheim (DE); Dieter Schwarzmann, Heilbronn (DE); Tobias Mauk, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 605 days.

(21) Appl. No.: 14/898,063

(22) PCT Filed: Apr. 16, 2014

(86) PCT No.: PCT/EP2014/057742
§ 371 (c)(1),
(2) Date: Dec. 11, 2015

(87) PCT Pub. No.: WO2014/198444
PCT Pub. Date: Dec. 18, 2014

(65) Prior Publication Data
US 2016/0141990 A1 May 19, 2016

(30) Foreign Application Priority Data
Jun. 13, 2013 (DE) .......... 10 2013 211 020

(51) Int. Cl.
*H02P 21/00* (2016.01)
*H02P 21/12* (2016.01)
(Continued)

(52) U.S. Cl.
CPC ........ *H02P 21/0003* (2013.01); *F02D 11/106* (2013.01); *G05B 13/021* (2013.01); *H02P 21/12* (2013.01)

(58) Field of Classification Search
CPC .... H02P 21/0003; H02P 21/12; F02D 11/106; G05B 13/021
See application file for complete search history.

(56) References Cited

U.S. PATENT DOCUMENTS

2011/0273127 A1* 4/2011 Imamura .......... F02D 41/1497
318/650

FOREIGN PATENT DOCUMENTS

CN  102868339 A  1/2013
DE  102008042931  * 1/2010
(Continued)

OTHER PUBLICATIONS

Basics of Electric Servo Motor, Aug. 12, 2008.*
(Continued)

*Primary Examiner* — Timor Karimy
(74) *Attorney, Agent, or Firm* — Maginot, Moore & Beck LLP

(57) ABSTRACT

A method for operating an electronically commutated servo motor includes activating the servo motor by a voltage space vector generated in accordance with a commutation pattern on the basis of a predefined torque and a rotor position of a rotor of the servo motor in accordance with an optimization target. The method further includes predefining an activation range that indicates a range of permissible voltage space vectors. The servo motor is activated in such a way that only voltage space vectors within the activation range are used.

15 Claims, 3 Drawing Sheets

(51) Int. Cl.
F02D 11/10 (2006.01)
G05B 13/02 (2006.01)

(56) References Cited

FOREIGN PATENT DOCUMENTS

| | | |
|---|---|---|
| DE | 10 2008 042 931 A1 | 4/2010 |
| DE | 10 2011 005 566 A1 | 9/2012 |
| JP | 2003-47300 A | 2/2003 |
| JP | 2004-72931 A | 3/2004 |
| JP | 2006-254618 A | 9/2006 |
| JP | 2008-43030 A | 2/2008 |
| JP | 2008-43058 A | 2/2008 |
| JP | 2009-261103 A | 11/2009 |
| JP | 2013-5618 A | 1/2013 |
| JP | 2013-38912 A | 2/2013 |
| WO | 2011/124346 A2 | 10/2011 |

OTHER PUBLICATIONS

International Search Report corresponding to PCT Application No. PCT/EP2014/057742, dated May 28, 2015 (German and English language document) (7 pages).
Adnanes, Alf Karc; Torque Analysis of Permanent Magnet Synchronous Motors; 22nd Annual IEEE Power Electronics Specialists Conference; Jun. 24-27, 1991; pp. 695-701; Cambridge, MA, USA.

* cited by examiner

METHOD AND DEVICE FOR OPERATING AN ELECTRONICALLY COMMUTATED SERVO MOTOR AND POSITION CONTROL UNIT HAVING A SERVO MOTOR

This application is a 35 U.S.C. § 371 National Stage Application of PCT/EP2014/057742, filed on Apr. 16, 2014, which claims the benefit of priority to Serial No. DE 10 2013 211 020.0, filed on Jun. 13, 2013 in Germany, the disclosures of which are incorporated herein by reference in their entirety.

The present disclosure relates to electronically commutated electric machines, in particular for position sensor applications, for example, for a throttle valve position sensor. The present disclosure furthermore relates to measures for limiting current in an electric machine controlled in such a way.

BACKGROUND

In position sensor applications, electronically commutated DC motors, so-called brushless DC motors, may be used as an alternative to brush-commutated DC motors. These motors generally have higher efficiency and a smaller size for otherwise comparable performance data. However, unlike brush-commutated DC motors, the electronically commutated DC motors must be electronically controlled or commutated, with a relatively accurate knowledge of the rotor position being required to select the control voltages, and knowledge of the motor current being required for torque-based controllers. Inaccuracies when detecting the rotor position and/or when measuring current result in significant reductions in the efficiency and the provided drive torque.

For throttle valve position sensors, it is provided to replace the servomotor by an electronically commutated drive motor, and instead of direct rotor position detection on the motor shaft, to detect the rotor position indirectly based on the already-existing throttle valve angle sensor at the throttle valve, which is connected to the motor shaft via a reducing gear. This system only allows inaccurate rotor position detection with typical uncertainties of more than 10° of the mechanical rotor position.

Furthermore, for reasons of cost, the provision of a current sensor system for detecting the motor current is to be omitted. In the case of such large angle uncertainties and additional parameter fluctuations, a control using commutation patterns which are applied as a function of the detected rotor position results in a violation of the current limits, which may result in the emergency shutdown of the motor by the power electronics.

The object of the present disclosure is therefore to provide a robust control for an electronically commutated position sensor motor, with which an overshooting of the current limits is eliminated, despite inaccuracies which occur during the determination of the rotor position and/or other parameter inaccuracies, and which thereby enables reliable operation.

SUMMARY

This object is achieved via the method for operating an electronically commutated position sensor motor as claimed in claim 1 and via the device, the position sensor system, and the computer program as claimed in the other independent claims.

Additional advantageous embodiments of the present disclosure are specified in the dependent claims.

According to a first aspect, a method for operating an electronically commutated servomotor is provided, wherein the servomotor is controlled according to an optimization target via a voltage space vector generated according to a commutation pattern, as a function of a predefined torque and a rotor position of a rotor of the servomotor, wherein a control range is predefined which specifies a range of allowable voltage space vectors, wherein the control of the servomotor is carried out in such a way that only voltage space vectors within the control range are used.

Furthermore, the control of the servomotor may be carried out based on a predefined characteristic map which specifies the voltage space vector according to the optimization target, as a function of the predefined torque and the rotor position of the rotor of the servomotor.

According to one specific embodiment, the characteristic map may identify voltage space vectors which do not meet the optimization target, in particular at a boundary of the control range.

An electronically commutated servomotor includes phase terminals, to each of which one phase voltage may be applied. The control of the servomotor via the phase voltages is referred to as commutation and specifies how the phase voltages are to be applied to the servomotor at any point in time, in order to set the motor current which generates the instantaneous required torque. The setpoint torque and the rotor position angle of the motor shaft are input values of the commutation.

In an electronically commutated servomotor in which no current detection is provided, the servomotor is operated in an unregulated manner with respect to the motor current. In this case, the rotational speed is also required as an input value for the commutation, in addition to the setpoint torque and the rotor position angle of the motor shaft. For a certain applied control voltage, an ideal servomotor would deliver the expected torque, and the corresponding motor current would result.

However, the motor parameters of the servomotor may deviate due to production variance and temperature influences, and/or the rotor position detection may be erroneous due to an indirect detection. This results in false commutation, in which the motor current and the resulting torque deviate from the setpoint values. If the deviation results in unallowably high motor currents, the power electronics must interrupt the operation of the servomotor in order to prevent overheating or destruction of the servomotor or the electronics. Particularly in safety-critical application areas, for example, in a throttle valve position sensor in an internal combustion engine, such an event must be avoided under all circumstances. Therefore, the control of the servomotor must be carried out in such a way that the magnitude of the motor current does not exceed a motor current threshold value, even in the case of inaccurate rotor position detection and fluctuations or uncertainties with respect to the motor parameters.

At most operating points, the servomotor may be operated with respect to an optimization target. According to the above operating method, in the case of operation in a boundary range, it is provided to deviate from the optimization target in favor of robustness.

The above method provides for initially associating the setpoint torque with a voltage vector in a fixed-rotor d-q coordinate system, for example, with the aid of characteristic maps which have been parameterized in a suitable manner. The voltage vector to be applied results from a corresponding characteristic map which is calculated offline and which may be provided for carrying out the method, as a function of the setpoint torque, the rotational speed, and a predefined optimization target. If the voltage vector to be applied was ascertained in the fixed-rotor d-q coordinate system from the characteristic map, a coordinate transformation may be carried out in order to determine the phase voltages for the control of the multiphase electronically commutated servomotor as a function of the rotor position.

Since only one target value, i.e., the setpoint torque, is to be set via multiple phase voltages to be applied, a plurality of control options exists in order to achieve a predefined setpoint torque. In this respect, for three-phase voltages, a degree of freedom is effectively available which creates a potential for optimization. This degree of freedom may be used separately and differently for any rotational speed and any setpoint torque to be achieved. According to the above method, this degree of freedom is used in order to achieve a control according to an optimization target in the nominal case. For this purpose, the control, i.e., the commutation pattern, must be determined separately for each rotational speed and each setpoint torque, via which the optimization target may be best achieved.

Furthermore, as a secondary condition for the optimization, it may be determined that for the optimization, only such approaches are considered which are not able to result in an overshooting of the maximum allowable motor current, in the case of inaccurate rotor position detection and in the case of parameter deviations or inaccuracies, even in the least favorable case. To create the characteristic map, a maximum possible error to be tolerated when determining the rotor position must be specified. Alternatively or additionally, the possible deviations of the parameters from their nominal values must be quantified. In the optimization, an unfavorable combination is to be ascertained from this, which is definitive for whether this control is allowable or not, as a function of the setpoint torque and the rotational speed for any possible control. From all allowable controls, the option may then be selected which is best with respect to the optimization target.

This creation of the characteristic map may be carried out offline, and the characteristic maps thus obtained are provided during the control of the servomotor.

The method for operating the servomotor has the advantage that an overshooting of the allowable motor current is prevented, even in the case of parameter deviations from nominal parameter values and/or in the case of inaccurate detection or provision of the rotor position.

In particular, the characteristic map may furthermore define voltage space vectors along a boundary of a control range, from a voltage space vector via which the optimization target is met, up to a voltage space vector via which a maximum achievable torque is provided.

It may be provided that the voltage space vectors of the characteristic map may be limited to the voltage space vectors allowed by the control range.

According to one specific embodiment, for a predefined torque and a rotor position for which no voltage space vector exists which meets the optimization target within the control range, a voltage space vector, via which the predefined torque is provided, which has the shortest distance from a voltage space vector meeting the optimization target, may be selected within the control range.

Furthermore, the servomotor may furthermore be controlled via a voltage space vector generated according to a commutation pattern, as a function of an instantaneous rotational speed of the servomotor.

The control range may specify a range of allowable voltage space vectors in which a magnitude of a motor current does not exceed a predefined motor current threshold value and/or a magnitude of a motor voltage does not exceed a predefined motor voltage threshold value.

Furthermore, the control range of allowable voltage space vectors may be defined in such a way that the predefined motor current threshold value and/or the predefined motor voltage threshold value is not exceeded, even in the case of deviation of the specified rotor position (L) from an actual rotor position by a predefined inaccuracy and/or a deviation of one or multiple motor parameters of the servomotor (2) from corresponding setpoint values by a predefined inaccuracy.

It may be provided that the optimization target for the characteristic map is determined in such a way that a voltage space vector is associated with the predefined setpoint torque, whereby a maximum efficiency of the servomotor is achieved.

According to an additional aspect, a device for operating an electronically commutated servomotor is provided, wherein the device is designed to
 control the servomotor according to an optimization target via a voltage space vector generated according to a commutation pattern, as a function of a predefined torque and a rotor position (L) of a rotor of the servomotor;
 specify a control range which indicates allowable voltage space vectors; and
 carry out the control of the servomotor in such a way that only voltage space vectors within the control range are used.

According to an additional aspect, a position sensor system is provided, comprising:
 an electronically commutated servomotor for driving an actuator; and
 the above device.

According to an additional aspect, a computer program product is provided which contains program code which carries out the above method, if it is executed on a computing unit.

BRIEF DESCRIPTION OF THE DRAWINGS

Preferred specific embodiments of the present disclosure will be explained in greater detail below based on the appended drawings.

DETAILED DESCRIPTION

Figure 1:
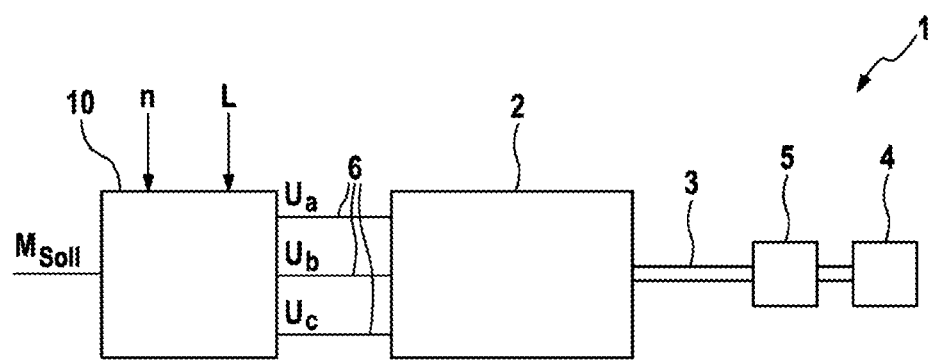
FIG. 1 shows a position sensor system including an electronically commutated servomotor.

FIG. 1 shows a position sensor system 1 including a servomotor 2 which is designed as an electronically commutated electric motor. The servomotor 2 drives an actuator 4 via a mechanism or a gear 5, via a motor shaft 3. For example, the position sensor system 1 may correspond to a throttle valve position sensor, in which a position of a throttle valve in the form of an actuator in an air supply system of an internal combustion engine is applied via corresponding control of the servomotor 2.

The servomotor 2 is electrically controlled via multiple phase terminals 6. In the present case, the servomotor 2 is designed as a three-phase electric machine. Phase voltages $U_a$, $U_b$, $U_c$ (phase potentials) are applied to the servomotor 2, which result in a corresponding current consumption by the servomotor 2, from which the torque provided by the servomotor 2 via the motor shaft 3 results.

The control of the servomotor 2 is carried out via a control unit 10, which receives a setpoint torque $M_{setpoint}$ as a default value and receives information about a rotational speed n and information about the rotor position L with the aid of a suitable sensor system. The control unit 10 generates the phase voltages $U_a$, $U_b$, $U_c$ for the control of the servomotor 2. The setpoint torque $M_{setpoint}$, being the default value, is used to carry out a commutation for the phase voltages $U_a$, $U_b$, $U_c$ as a function of a commutation pattern. The commutation designates the manner in which the phase voltages $U_a$, $U_b$, $U_c$ are to be applied to the phase terminals 6 of the servomotor 2 at any point in time in order to generate the instantaneously required setpoint torque $M_{setpoint}$. In the case of three or more phase voltages to be applied, there is a plurality of control options for achieving a setpoint torque $M_{setpoint}$. In this case, at least one degree of freedom is available, which creates a potential for optimization. This degree of freedom may be used separately and differently for any rotational speed or for any rotational speed range, for any setpoint torque $M_{setpoint}$ to be achieved.

The above position sensor system 1 is to be created having a high degree of robustness. However, during the detection of the rotor position L, and due to parameter fluctuations of the servomotor 2, deviations between the ideal and the actual current consumption frequently occur. If the motor current exceeds a predefined motor current threshold value, the control unit 10 generally provides for an emergency shutdown in order to protect the control unit 10 and/or the servomotor 2 from damage or destruction.

In particular in the case of position sensor systems 2 in which the rotor position detection is carried out indirectly, i.e., for example, at the actuator 4 connected to the servomotor 2 via the gear 5, there may be a high degree of inaccuracy during the detection of the rotor position L, which may be significantly greater than 10° of mechanical angular position.

In the case of the control via the phase voltages $U_a$, $U_b$, $U_c$, a space vector is formed which indicates a direction of a rotating stator magnetic field during the operation of the servomotor 2. In order to be able to depict the space vector independently of the rotational speed, it is generally depicted in a fixed-rotor d-q coordinate system.

The degrees of freedom may be used in the case of an optimization according to a predefined optimization target, for example, an optimization with respect to efficiency.

Figure 2:
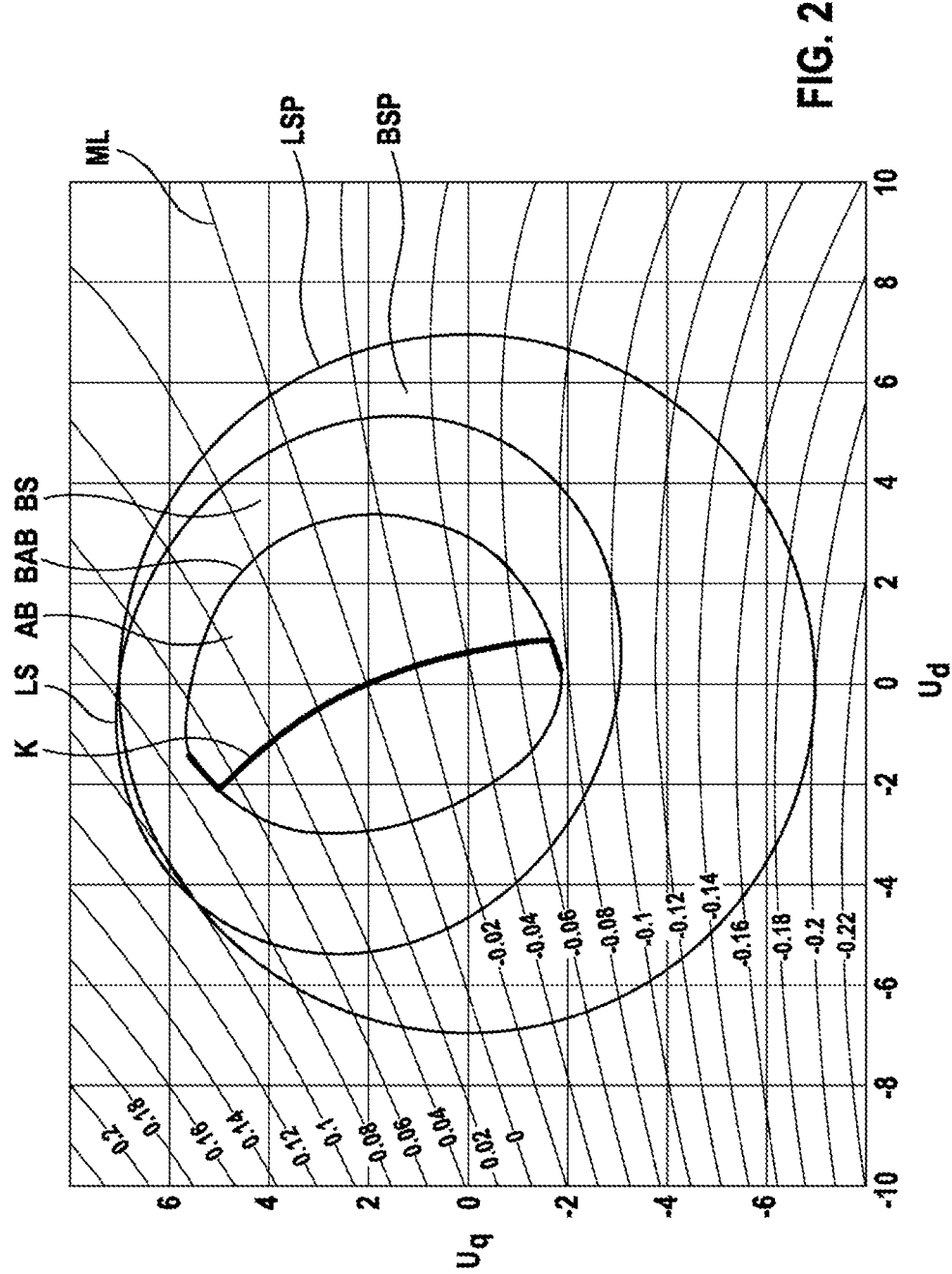
FIG. 2 shows a diagram for depicting a robust allowable control range and an exemplary commutation strategy in a fixed-rotor d-q coordinate system for a predefined rotational speed of the servomotor.

FIG. 2 shows a diagram of the voltage vectors $U_d$, $U_q$ of the d-q coordinate system. Furthermore, the current range BS of the allowable currents and the voltage range BSP of the allowable voltage are depicted by the circular or approximately elliptical boundary lines. The current range BS of the allowable motor currents represents the range of space vectors in the fixed-rotor d-q coordinate system in which the magnitudes of the motor currents are below a predefined motor current threshold value. The current boundary line LS of the current range BS of the allowable motor currents represents the line of all $U_q$, $U_d$ combinations in which the motor current achieves the motor current threshold value.

Similarly, the voltage range BSP of the allowable motor voltages represents the range in which the space vectors $U_q$, $U_d$ are allowed to lie, so that a predefined motor voltage threshold value is not exceeded. The motor voltage threshold value which results from the phase voltages $U_a$, $U_b$, $U_c$ between two phase terminals 6 is essentially limited by the availability of the supply voltage for the operation of the servomotor 2. The voltage range BSP of the phase voltages $U_a$, $U_b$, $U_c$ which are allowable or providable in the case of a predefined supply voltage is represented by the voltage boundary line LSP, which indicates the set of all space vectors $U_q$, $U_d$ in which the phase voltages $U_a$, $U_b$, $U_c$ correspond to the predefined phase voltage threshold value.

Based on the current range BS and the voltage range BSP of the allowable motor currents and the allowable phase voltages $U_a$, $U_b$, $U_c$, a robust, allowable control range AB is now ascertained, which in any case excludes an increase of the motor current beyond the motor current threshold value predefined via the current boundary line LS in the case of a predefined inaccuracy of the rotor position detection and/or a parameter inaccuracy. Thus, with the aid of the predefined rotor position inaccuracy and the predefined parameter inaccuracy, a worst-case scenario is ascertained for any rotational speed and for any voltage space vector.

Furthermore, the depicted characteristic map indicates the space vector values for achieving a particular torque. They are indicated by the torque lines ML. It is apparent that many space vector controls are possible within the control range AB for providing a setpoint torque $M_{setpoint}$ in order to select the predefined setpoint torque $M_{setpoint}$ in the case of rotor position or parameter inaccuracies, while avoiding a motor current which is too high.

Figure 3:
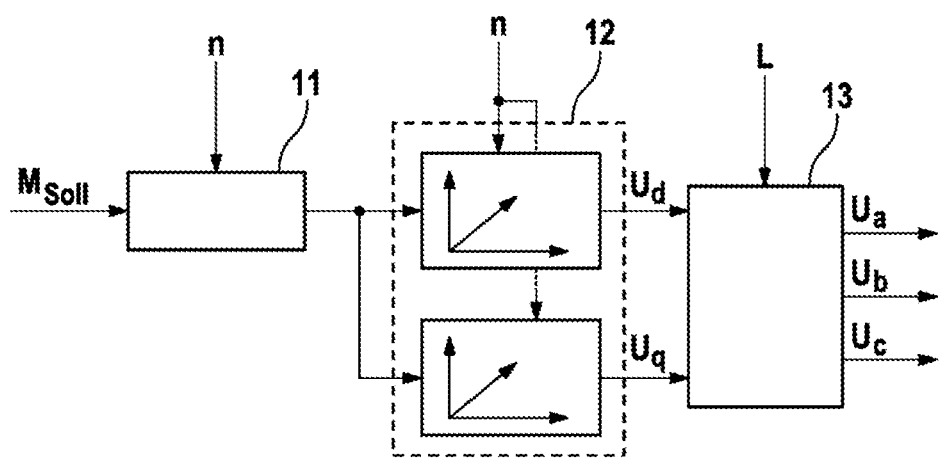
FIG. 3 shows a functional depiction of the method for ascertaining the phase voltages for operating the electronically commutated servomotor.

FIG. 3 shows a schematic representation of the control unit 10. The control unit 10 includes a limiting unit 11 which limits the required torque as a function of an instantaneous rotational speed n and based on the predefined setpoint torque $M_{setpoint}$.

In the characteristic map block 12, a space vector $U_q$, $U_d$ to be applied is now ascertained in the fixed-rotor d-q coordinate system as a function of the required torque and the rotational speed n. The ascertainment is carried out with reference to the diagram in FIG. 2 as follows:

First, a characteristic map K spanned by the required setpoint torque $M_{setpoint}$ and the rotational speed is provided, in which the space vectors $U_q$, $U_d$ are associated with an operating point within the current range BS and the voltage range BSP, via which the control range AB is determined taking into consideration the parameter inaccuracies and inaccuracies of the rotor position detection, so that the predefined optimization target is maintained. If a space vector $U_q$, $U_d$ lying within the control range AB exists on the characteristic map K for the predefined setpoint torque $M_{setpoint}$ and the instantaneous rotational speed n, it is used for the control of the servomotor 2.

If no intersection of the torque line ML is found which corresponds to the setpoint torque $M_{setpoint}$, the predefined characteristic map K is left at an outer boundary line BAB of the control range AB, and instead, a check is made at the boundary line BAB for the control range AB whether the desired setpoint torque $M_{setpoint}$ may be achieved via a space vector $U_q$, $U_d$ on the relevant boundary line BAB of the control range AB. If this is the case, the corresponding space vector $U_q$, $U_d$ is provided. Otherwise, the space vector $U_q$, $U_d$ is applied, via which it is possible to achieve the maximum torque without leaving the allowable control range AB.

In a coordinate transformation block 13, the provided space vector $U_q$, $U_d$ is converted into the corresponding phase voltages $U_a$, $U_b$, $U_c$ with the aid of the detected rotor position L.

The characteristic map K for ascertaining the optimized space vector $U_q$, $U_d$ via the input values of setpoint torque $M_{setpoint}$ and rotational speed n is created offline and mapped or stored in the control unit 10, for example, via a lookup table or another function representing the characteristic map K. The optimization is carried out based on conventional methods and results in the characteristic map K, which is valid inside the control range AB. The space vectors $U_q$, $U_d$ of the characteristic map K which are located on the boundary line BL of the control range replace the space vector characteristic curve up to a highest torque in terms of magnitude, so that the space vectors $U_q$, $U_d$ are predefined in the direction of high torques in terms of magnitude via the boundary line BAB as soon as the space vector characteristic curve meets the boundary line BAB. A characteristic trisection of the characteristic curve results, as depicted in FIG. 2 inside the control range.

Instead of a maximization of the efficiency, other targets may also be pursued as an optimization target for the space vector characteristic curve inside the allowable control range.

Since the parameter uncertainties may be attributed to temperature influences to a considerable extent, the consideration of the overall temperature range of the servomotor 2 may greatly restrict the robustly available torque. If the instantaneous temperature of the servomotor 2 is able to be determined or estimated, the control may be separately designed for various temperature ranges and switched between predefined characteristic maps depending on the instantaneous temperature.

The invention claimed is:

1. A method for operating an electronically commutated servomotor, comprising:
generating a voltage space vector as a function of a predefined torque and a rotor position of a rotor of the servomotor, wherein the voltage space vector indicates the direction of a rotating stator magnetic field during the operation of the servomotor;
controlling the servomotor according to an optimization target via the generated voltage space vector;
determining a control range which specifies a range of allowable voltage space vectors;
determining using the control range, the range of allowable voltage space vectors in which a magnitude of a motor current does not exceed a predefined motor current threshold value and/or a magnitude of a motor voltage does not exceed a predefined motor voltage threshold value; and
controlling the servomotor with only voltage space vectors within the predefined control range.

2. The method as claimed in claim 1, further comprising:
further controlling the servomotor based on a predefined characteristic map which specifies the voltage space vector according to the optimization target, as a function of the predefined torque and the rotor position of the rotor of the servomotor.

3. The method as claimed in claim 2, further comprising:
determining voltage space vectors which do not meet the optimization target with the characteristic map.

4. The method as claimed in claim 3, further comprising:
determining, using the characteristic map, voltage space vectors along a boundary of a control range, from a voltage space vector via which the optimization target is met, up to the voltage space vector via which a maximum achievable torque is provided.

5. The method as claimed in claim 2, further comprising:
determining allowed voltage space vectors of the characteristic map by limiting the voltage space vectors of the characteristic map to the voltage space vectors allowed by the control range.

6. The method as claimed in claim 5, further comprising:
selecting within the control range, for a predefined torque and a rotor position for which no voltage space vector exists which meets the optimization target within the control range, the voltage space vector, via which the predefined torque is provided, which has the shortest distance from a voltage space vector meeting the optimization target.

7. The method as claimed in claim 2, further comprising:
determining the optimization target for the characteristic map in such a way that the voltage space vector is associated with a predefined setpoint torque, to achieve a maximum efficiency of the servomotor.

8. The method as claimed in claim 1, further comprising:
further controlling the servomotor via the voltage space vector generated according to a commutation pattern, as a function of an instantaneous rotational speed of the servomotor.

9. The method as claimed in claim 1, further comprising:
defining the control range of allowable voltage space vectors in such a way that the predefined motor current threshold value and/or the predefined motor voltage threshold value is not exceeded, even in the case of deviation of the specified rotor position from an actual rotor position by a predefined inaccuracy and/or a deviation of one or multiple motor parameters of the servomotor from corresponding setpoint values by a predefined inaccuracy.

10. The method as claimed in claim 1, wherein a computer program is configured to carry out the method.

11. The method as claimed in claim 10, wherein the computer program is stored on an electronic storage medium.

12. The method as claimed in claim 11, wherein an electronic control unit includes the electronic storage medium.

13. The method as claimed in claim 1, wherein a computer program product contains a program code configured to carry out the method, if the computer program is executed on a computing unit.

14. A method for operating an electronically commutated servomotor, comprising:
determining a control range which specifies a range of allowable voltage space vectors, wherein the voltage space vectors indicate the direction of a rotating stator magnetic field during the operation of the servomotor;
generating a voltage space vector as a function of a predefined torque and a rotor position of a rotor of the servomotor;
controlling the servomotor (i) according to an optimization target via the generated voltage space vector such that only voltage space vectors within the predefined control range are used and (ii) based on a predefined characteristic map which specifies the voltage space vector according to the optimization target;
determining voltage space vectors which do not meet the optimization target with the characteristic map;
determining allowed voltage space vectors of the characteristic map by limiting the voltage space vectors of the characteristic map to the voltage space vectors allowed by the predefined control range;

determining with the predefined control range the range of allowable voltage space vectors in which a magnitude of a motor current does not exceed a predefined motor current threshold value and/or a magnitude of a motor voltage does not exceed a predefined motor voltage threshold value; and determining the voltage space vectors of the characteristic map in a fixed-rotor coordinate system as a function of the predefined torque and a predefined rotational speed.

15. A method for operating an electronically commutated servomotor, comprising:

controlling the servomotor according to an optimization target via a voltage space vector generated according to a commutation pattern, as a function of a predefined torque and a rotor position of a rotor of the servomotor;

determining a control range which specifies a range of allowable voltage space vectors;

determining using the control range, the range of allowable voltage space vectors in which a magnitude of a motor current does not exceed a predefined motor current threshold value and a magnitude of a motor voltage does not exceed a predefined motor voltage threshold value; and controlling the servomotor with only voltage space vectors within the predefined control range.

\* \* \* \* \*